Aug. 14, 1945.   R. H. LONG   2,382,078
VARIABLE CYCLE TIMER
Filed Jan. 17, 1944   2 Sheets-Sheet 2
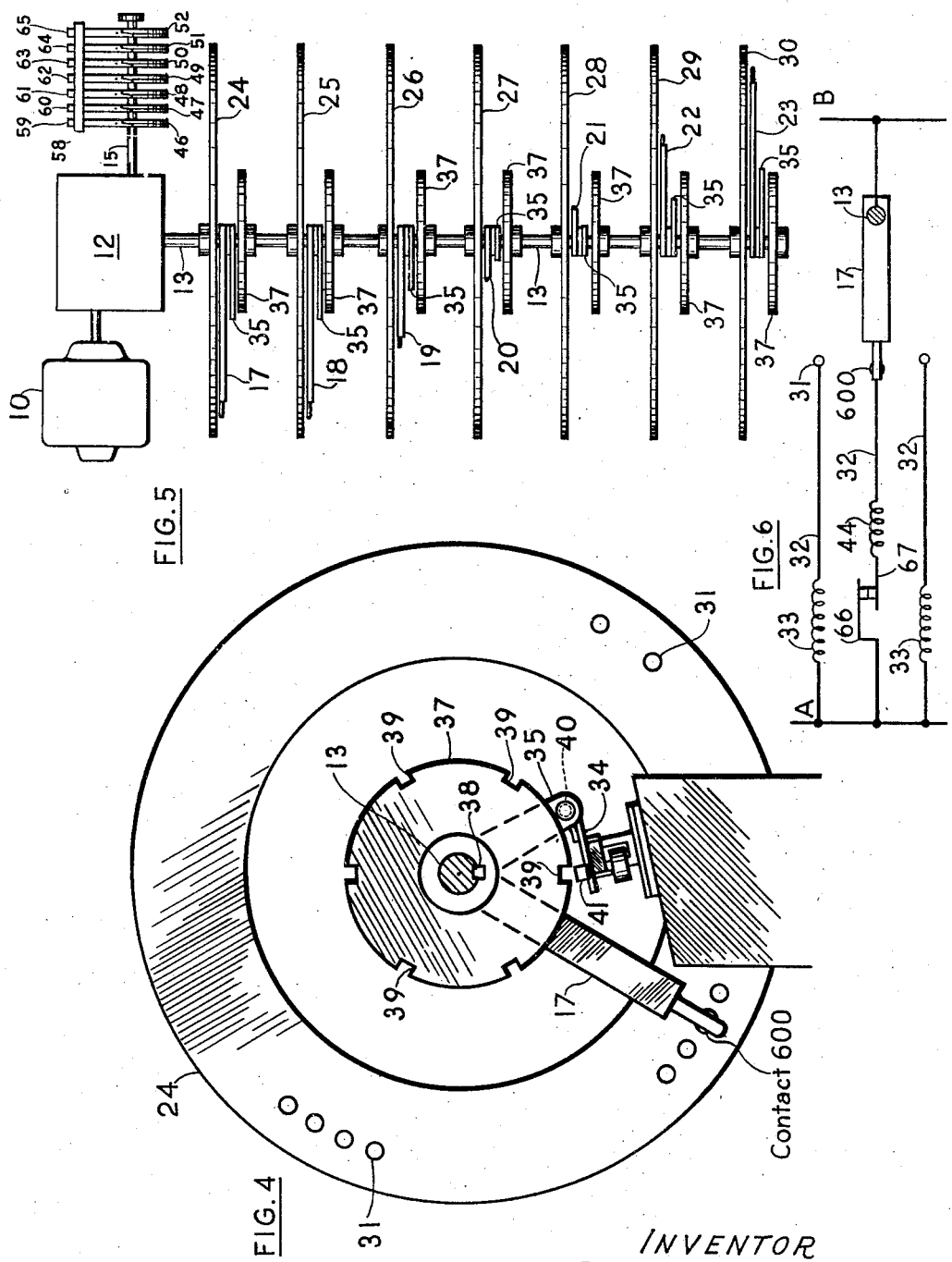
INVENTOR
RICHARD H. LONG
BY
ATTORNEY Patented Aug. 14, 1945

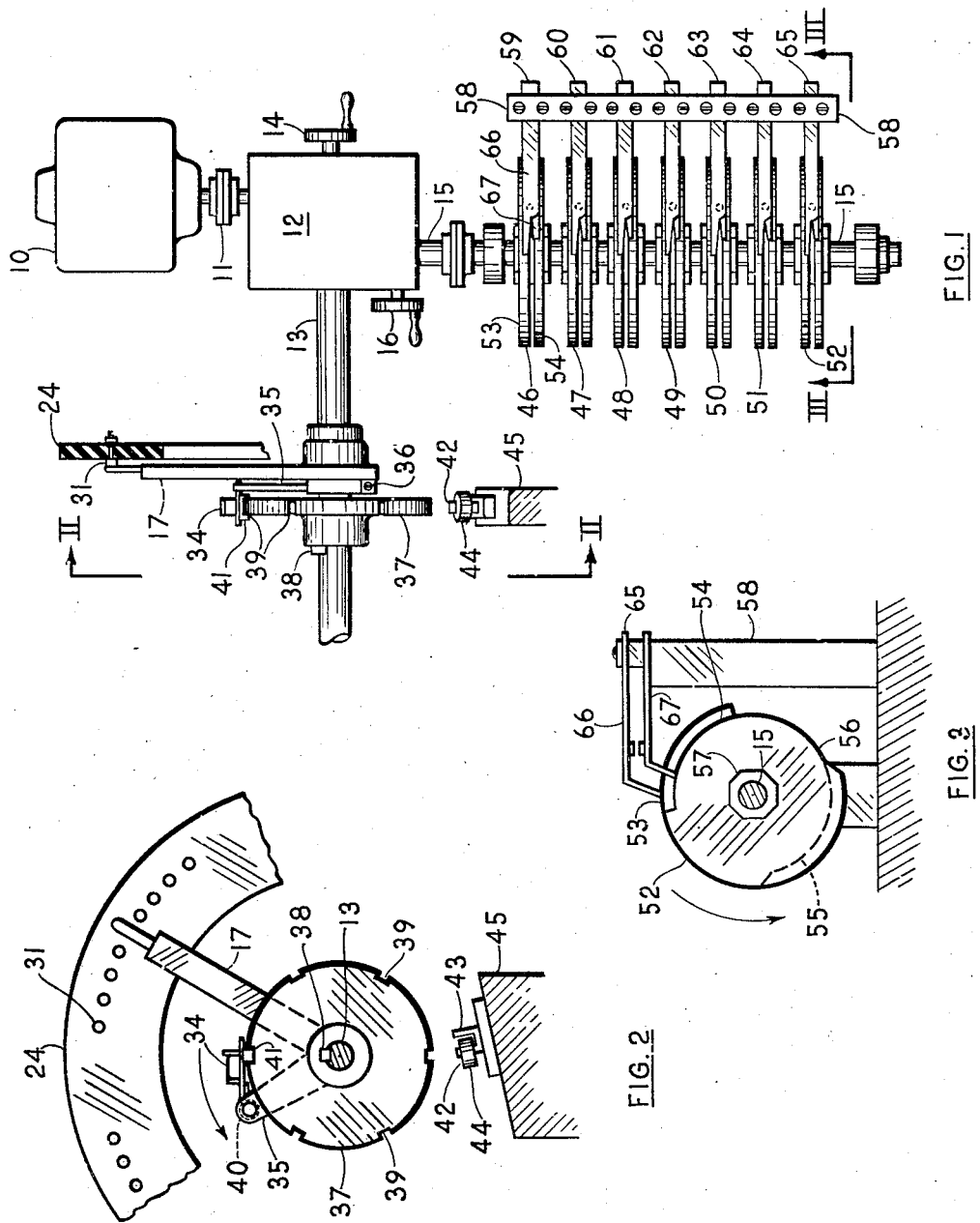

2,382,078

UNITED STATES PATENT OFFICE 2,382,078

VARIABLE CYCLE TIMER

Richard H. Long, Oakland, Calif., assignor, by mesne assignments, to California Research Corporation, San Francisco, Calif., a corporation of Delaware Application January 17, 1944, Serial No. 518,531

9 Claims. (Cl. 200—33)

This invention relates to regulating apparatus for controlling industrial processes which are to be carried out in a definite time and sequence of steps, and particularly refers to one in which a succession of normal operating cycles are to be controlled, followed at a predetermined time by an abnormal cycle, after which the normal operation is resumed.

In certain chemical processes, for example catalytic petroleum cracking processes, in which the catalyst is maintained in a stationary bed in a reaction chamber in which reaction and regeneration of the catalyst take place in the reactor without removing or disturbing the catalyst, it becomes necessary to control the successive cycles of heating, purging, reacting, reactivating and the like by means such as motor operated cyclically controlled valves which admit the various fluids to the reaction chamber. Certain of these processes require that, after a certain number of cycles of normal operation, an abnormal cycle is required, for example, a regeneration period which lasts approximately four times as long as a normal regeneration period. Heretofore operations of this kind have been controlled by means of a plurality of contacts and a constantly rotated arm energizes the successive contacts at predetermined intervals to actuate the relays, motor control means and interlocking control apparatus which are connected to the several contacts. In such an arrangement where the arm rotates at a uniform speed or is advanced at uniform intervals, the provision of an abnormal cycle or period is difficult if not entirely impractical to accomplish economically due to the tremendous number of contacts which would be required to cover a complete symmetrical cycle, as will be appreciated by one skilled in this art. Various expedients, such as temporarily stopping the drive motor for the energizing arm during long periods in which no functions take place, have been attempted, which would greatly reduce the number of contacts required but even then the total number would run into prohibitive proportions. It will be appreciated that while one reactor of a group is on its abnormal period, it is essential that the normal sequence of operations be carried out on the remaining reactors by actuating the controls therefor.

It is an object of this invention to provide a process timer adapted to control a plurality of separate cyclic processes, any one of which may selectively be placed in an abnormal operating condition without interfering with the remaining units and without requiring great numbers of contact points or positions for the separate reactors. This is accomplished by a novel clutch or coupling means adapted to be selectively connected to and disconnected from a continuously rotating timing shaft, the actuation of the several clutch means being controlled by a separate timer adapted to determine the occurrence and duration of such abnormal cycles, a separate clutch means being provided for each reactor control unit of the several that are required under such circumstances.

It is another object of this invention to provide a timing mechanism for controlling and maintaining the sequence of steps of processes having varying time cycles.

Another object is to provide a timing mechanism for a plurality of control means which operate at the same rate but are displaced in phase, with the added provision that one of the number may be continuously maintained for a predetermined period in an abnormal condition, after which it may be restored to its normal operating cycle, in predetermined relation to the operation of the rest of the control means.

Other objects and advantages will be found apparent from the accompanying description and from the accompanying drawings which illustrate a preferred embodiment of the invention as applied to a plurality of contactors of the type described.

In the drawings,

Figure 1 is a diagrammatic plan view, partly in section, showing a coupling or clutch embodying this invention together with driving means therefor.

Figure 2 is a vertical elevational view on line II—II of Figure 1 illustrating in more detail the energizing arm and contacts of a unit of the main timing mechanism.

Figure 3 is an end elevational view on line III—III of Figure 1 illustrating the supplemental timing means for controlling the abnormal cycle mentioned above.

Figure 4 is an end elevational view of the energizing arm arrangement of Figure 2 while the latch or clutch means are actuated to maintain an abnormal cycle for that particular arm.

Figure 5 is a diagrammatic plan view of a complete timer illustrating the energizing arms in their several positions for controlling a plurality of reactors, one of which is on its abnormal period.

Figure 6 is a schematic wiring diagram illustrating the electrical relationship between an energizing arm and the latch control means and process cycle control contacts.

In the drawings, reference numeral 10 designates generally a power source which may be a synchronous motor rotating at a constant speed. Motor 10 is connected through coupling 11 to a variable speed transmission 12 adapted to drive a main shaft 13 at a constant speed controlled by adjusting means 14, the transmission desirably, but not necessarily, being provided with a second shaft 15, the speed of which may be separately controlled by means 16. Main shaft 13 is provided with a plurality of energizing arms 17 to 23 inclusive, each of which is adapted to control the sequence and duration of operation of the several motor driven valves or other control means for a single reactor. Figure 1 illustrates only one of the seven arms while Figure 5 shows a plan view of all of them.

Adjacent to arms 17 to 23 inclusive are stationary electrically insulating supports 24 to 30 inclusive, the latter being parallel to the plane of rotation of arms 17 to 23 and provided with a plurality of circumferentially spaced contacts generally designated 31, the latter being adapted to be contacted by the said arms and connected by conventional electrical circuits generally designated 32 to the coils 33 of the separate relays (Figure 6) which actuate the motor operated valves or other conventional means (not shown) used to control the several processes carried out successively in the reactors of this example. The details of these circuits, together with the conventional supervisory means commonly used in apparatus of this kind to insure that one valve or other control mechanism has completed its function before the next operation is instituted by the energizing arm forms no part of this invention and, consequently, is not described herein.

Arms 17 to 23 are each selectively mechanically engaged with the constantly rotating shaft 13 by means of latch members or couplers generally designated 34, each supported on a stub arm 35, the latter being mounted on its respective contact energizing arm 17 to 23, inclusive, in such a manner that it may be angularly adjusted thereto. After such adjustment is made it may be secured by any suitable clamping means such as screw 36 on the hub of stub arm 35. Adjacent each stud arm 35 and secured to shaft 13 to rotate therewith are a plurality of indexing means which, in this example, are discs 37 keyed to shaft 13 by means of keys 38. The indexing functions of discs 37 may be carried out in a variety of ways, but in this example they constitute a plurality of circumferentially spaced peripheral notches 39, the number corresponding to the number of reactors which are on normal cycle, in this case six. These are generally equidistantly spaced so that a continuous output may be had from the entire group of intermittently operating reactors. The extra, or seventh reactor, will normally be on an abnormal cycle or may be maintained in reserve to take the place of any one of the six reactors usually used.

Latch member 34, which is positioned at the outer end of each stub arm 35, is desirably biased by means of spring 40 so that lug 41 of the latch will engage any one of notches 39 on its respective indexing disc 37, and will remain therein until it is intentionally withdrawn. Thus it will be appreciated that there has been provided a clutch or latch means by means of which contact energizing arms 17 to 23 inclusive may be selectively engaged with the uniformly rotating shaft 13 to be turned thereby so long as latches 34 are engaged with their respective indexing means or discs 37. As shown in Figure 5, arms 17 may be displaced 60° apart so that the valve controls of several reactors may be held in a uniform predetermined phase or operating relation. Latch arms 35 being angularly adjustable relative to each of the contact energizing arms 17 to 23 may be positioned in such a manner that arms 17 will, at any given instant, cooperate with any desired contact 31 of supports 24 to 30 inclusive, depending upon the operation to be instituted or terminated by that contact.

In order to disengage the latch member 34 from indexing means 37, there is provided for each unit of this example means such as an electromagnet 42 having a conventional core 43 and a winding 44. Each is so positioned on a support member 45 that latch 34 will be opposite core 43 once during each revolution of each indexing disc 37. Thus, if winding 44 is energized at that moment from a suitable electrical power source AB (Figure 6), latch 34 will be disengaged, thus disconnecting arms 35 and 17 and leaving them in a stationary position on any desired contact, for example No. 600, so long as the electromagnet 42 remains energized. It will be appreciated that the arrangement just described may be used to institute and control the additional time duration of the abnormal cycle of any one of the seven reactors in this example.

The timing for the energizing of electromagnets 42 may be carried out by any desired means. In this example shaft 15, which may be driven from variable speed transmission 12 at a different rate than shaft 13, is provided with seven sets of cams, each set being adapted to open and close contacts which control the energizing of the respective electromagnets 42. Referring to Figure 1, reference numerals 46 to 52 inclusive designate these sets of cams, each of which is composed of two discs 53 and 54 having cutout portions 55 and 56 on their peripheries. Each disc is adjustably secured to shaft 15 by means such as nuts 57 so that their cutout portions may be suitably spaced circumferentially. Adjacent shaft 15 is a stationary support 58 adapted to carry a plurality of sets of spring contactors 59 to 65 inclusive, the latter each consisting of an upper spring 66 and a lower spring 67, each of these being provided on their adjacent faces with suitable contacts.

Referring now to cam set 52 which, in this example, is intended to control electromagnet 42 of that indexing means 37 which drives energizing arm 17, it will be noted that upper spring 66 is designed to ride upon cam 53 and lower spring 67 is designed to ride upon cam 54. So long as spring 66 is on the larger diameter portion of cam 53 and spring 67 is on the smaller or cutout portion 56 of cam 54, the contacts carried by springs 66 and 67 will be separated due to the relative displacement of the springs, and electromagnet 42 will remain unenergized so that latch means 34 will continue to carry arms 35 and 17 over contacts 31 of support 24. Whenever spring 67 rides upon the larger diameter portion of cam 54 or spring 66 drops off the larger diameter portion of cam 53, the contacts carried by springs 66 and 67 will be closed. Thereafter, when the brush on arm 17 reaches contact 600 the circuit shown in Figure 6 will be completed through coil 44 of electromagnet 42, energizing the latter from bus AB and disengaging latch 34, leaving arms 35 and 17 in a stationary position. This stationary position is at contact 600 and arm 17 will remain at that point for the duration of time which is to be added to the abnormal cycle of the specific reactor being controlled. The stopping of the timer arm 17 may take place at any time during that portion of the cycle which is to be extended, but is usually set at some time near the middle of this period. So long as contactor springs 66 and 67 of the auxiliary or secondary cam timer 52 remain closed, no further motion of arm 17 will take place. It will be understood that two circuit closing means in series actually control the operation just described, namely cam timer 52, which closes the spring contactor 66—67 first, and later the circuit is completed when arm 17 reaches contact 600. During normal cycles the magnet coil 44 is not energized when timer arm 17 passes over that contact. Thus it will be appreciated that numerous different timing and phasing arrangements are possible with the apparatus described herein.

Meanwhile, shaft 13 continues its uniform rate of rotation and drives the remaining timer arms 18 to 23 inclusive through their respective cycles. Timer shaft 15 is also rotating and when cams 53 and 54 have reached a position where the contacts 66 and 67 are opened, latch 34 will be released by electromagnet 42 so that its lug 41 will engage the next succeeding notch 39 of indexing means 37 which passes said latch. This will connect arms 35 and 17 through indexing means 37 to shaft 13, thus completing the extended time period identifying the abnormal cycle. At the same time, one of the other cam timers 47 to 52 inclusive will have been actuated by shaft 15 to cause another one of arms 18 to 23 inclusive to remain on its contact 600 for the predetermined time extension identifying the abnormal cycle which it is desired to institute for the reactor or other apparatus or process which that arm controls.

Although a single embodiment of this invention has been described and a specific application of it to a plurality of reactors has been discussed, it is obvious that numerous modifications could be made in the structure and its mode of operation without departing from the essential features of the invention. These appear to reside in the combination of two movable contactors, one operating continuously and the other adapted to be connected to and released from its driving means by a predetermined conjoint action of both contactors, the second contactor remaining in a stationary position until the other or continuously operating contactor reaches a desired condition which repeats the cycle just described. Accordingly, all such modifications and changes that come within the scope of the appended claims are embraced thereby.

I claim:

1. A timer for controlling the operation of a plurality of devices cyclically which comprises operating means for each device, a plurality of stationary supports each having a set of contacts thereon in circuit with said operating means, a continuously rotating shaft, an energizing arm for each set of contacts freely supported on said shaft, a plurality of indexing means secured to said shaft, one for each energizing arm, a latch member for selectively connecting each arm to its corresponding indexing means at a predetermined position of the latter, and electromagnetic means for rendering said latch member ineffective at a predetermined position of said arm to stop the latter.

2. A timer according to claim 1 in which each of said latch members is secured to its particular arm and is carried thereby through at least a part of a complete revolution of said indexing means after it has engaged said indexing means.

3. A timer according to claim 1 with the addition of a second timing means for controlling the operation of said electromagnetic means.

4. A timer according to claim 1 with the addition of a second timing means for controlling the operation of said electromagnetic means, said second timing means comprising a contactor in series with the contact on which said energizing arm rests when said latch member is rendered ineffective by said electromagnetic means, said contactor having a period of operation different than that of said energizing arm.

5. A timer for controlling the operation of a plurality of devices in a predetermined sequence and for predetermined time periods which comprises a set of stationary contacts, a continuously rotating shaft, an energizing arm for each set of contacts, indexing means secured to said shaft for each energizing arm, a latch member carried by each arm for selectively connecting it to its corresponding indexing means at any one of a number of predetermined positions of the latter, and separately timed means for actuating said latch member to engage it with and disengage it from said indexing means.

6. A timer according to claim 5 in which said latch actuating means comprises an electromagnet for releasing said latch from said indexing means, said separately timed means adapted to hold said latch in an inoperative position for a predetermined time and then release it to engage said indexing means.

7. A timer according to claim 5 in which said separately timed means comprises a contactor in series with that stationary contact on which said energizing arm rests when said latch actuating means is energized.

8. In a device for regulating a timed cycle of an industrial process involving a succession of normal operations followed by an abnormal operation, the combination of a stationary timing member having a plurality of contacts and a cooperating contact energizing arm, a continuously rotating shaft, indexing means secured to said shaft, means for connecting said arm to said indexing means and said shaft at any one of a number of positions of said indexing means to control said normal operations of said industrial process, and a separately timed means for actuating said connecting means to disengage said arm from said indexing means and said shaft for the duration of said abnormal operation.

9. In a device according to claim 8, in which said connecting actuating means comprises an electromagnet and said separately timed means comprises a contactor, and speed changing means connecting said contactor and said shaft.

RICHARD H. LONG.